United States Patent [19]

Ogawa et al.

[11] Patent Number: 5,773,743
[45] Date of Patent: Jun. 30, 1998

[54] EFFECT CONTROL METHOD, AN EFFECT CONTROL DEVICE AND A KARAOKE SYSTEM USING SUCH METHOD AND DEVICE

[75] Inventors: Sachio Ogawa; Atsushi Kitahara; Shigenori Yokoe, all of Tokyo, Japan

[73] Assignee: Sega Enterprises, Ltd., Tokyo, Japan

[21] Appl. No.: 448,668

[22] Filed: May 24, 1995

[30] Foreign Application Priority Data

Dec. 1, 1994 [JP] Japan ................................. 6-298706

[51] Int. Cl.[6] .............................. G10H 1/00; G10H 1/02
[52] U.S. Cl. ............................... 84/610; 84/626; 84/634; 84/DIG. 26; 434/307 A
[58] Field of Search ............................ 84/610, 626, 627, 84/628, 629, 630, 631, 632, 633, 634, DIG. 4, DIG. 26, 477 R, 609, 645; 434/307 A

[56] References Cited

U.S. PATENT DOCUMENTS

| 5,194,682 | 3/1993 | Okamura et al. ...................... 84/625 |
| 5,245,128 | 9/1993 | Araiza .................................... 84/626 |
| 5,247,126 | 9/1993 | Okamura et al. ...................... 84/609 |
| 5,463,691 | 10/1995 | Nakae et al. ........................... 381/61 |

FOREIGN PATENT DOCUMENTS

| 0488732 | 11/1991 | European Pat. Off. . |
| 0595331 | 10/1993 | European Pat. Off. . |
| 60-23896 | 2/1985 | Japan . |
| 262759 | 3/1990 | Japan . |
| 2216690 | 8/1990 | Japan . |
| 5333888 | 12/1993 | Japan . |
| 5341794 | 12/1993 | Japan . |
| 6124093 | 5/1994 | Japan . |
| 6124094 | 5/1994 | Japan . |
| 6130979 | 5/1994 | Japan . |
| 2276754 | 3/1994 | United Kingdom . |

Primary Examiner—Stanley J. Witkowski
Assistant Examiner—Marlon Fletcher
Attorney, Agent, or Firm—Price, Gess & Ubell

[57] ABSTRACT

An effect control method, an effect control device with the following configuration is provided on a karaoke system, which is one of audio regenerator or synthesizer systems. That is, a commander 200 is provided on the karaoke system and comprises a reading part 100, which reads out music information comprised of sound information and visual information and the effect control data from CD-ROM 207, a built-in hard disk 101 for storing the music information transmitted from a host database 213, an image regenerating part 102 which regenerates images from said visual information, a sound regenerating part 103, which regenerates sounds of the karaoke accompaniment music from said sound information, an effect setting switch 104 for setting the microphone effect control data, an effector 105 for applying the effects to the sound information and the voice input from microphone on the basis of the effect control data, and controlling line 106 for transmitting the microphone effect control data read by the reading part 100 directly to the effector 105. This karaoke system makes it possible to specify the desired effects easily and flexibly for audio data sets in general and provide automatic controls in giving the effect operation to these data sets, without enlarging the device size.

14 Claims, 3 Drawing Sheets

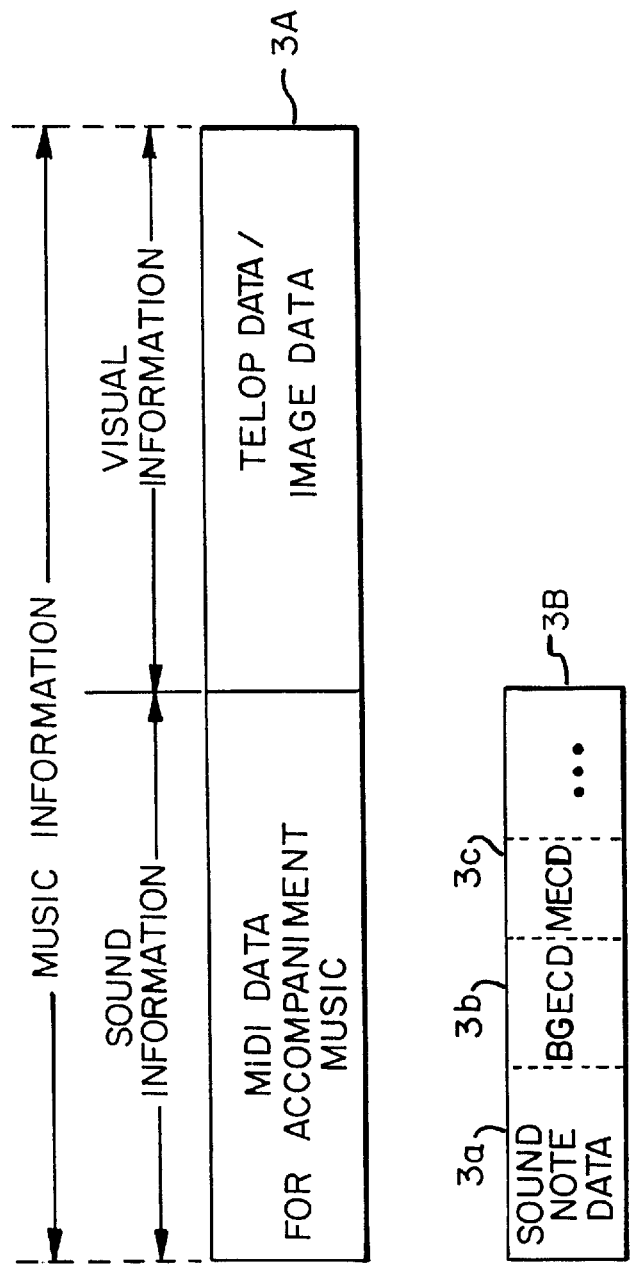

EFFECT CONTROL METHOD, AN EFFECT CONTROL DEVICE AND A KARAOKE SYSTEM USING SUCH METHOD AND DEVICE

BACKGROUND OF THE INVENTION

1. Technical Field

This invention relates to an effect control method and an effect control device for automatically controlling audio effect operations given to a particular audio data such as voices input via a microphone and a karaoke system which uses such a method and device.

2. Background Art

The "karaoke", a form of entertainment in which only the accompaniment music is regenerated and played as one sings the corresponding lyrics along with it, has been widely accepted by the general public maintaining a stable popularity. In this "karaoke", a regeneration device (hereinafter referred to as karaoke system) is used to regenerate the accompaniment part of songs and display the lyrics as telop on a monitor screen, corresponding to this accompaniment.

In general, a karaoke system converts the accompaniment part into digital audio signals as music data based on the MIDI (Musical Instrument Digital Interface) standards as well as converts the lyric part into character data. These data are stored in form of a music information in a storage media such as a CD-ROM. There is a karaoke system known wherein, a desired set of music information specified from a terminal device via a public telephone line is read out and transmitted to the terminal device from a host computer which stores a vast amount of different sets of music information. (laid-open Japanese patent publication No. Hei 2-216690).

In such karaoke systems, various means have been conventionally used to provide a more satisfactory stage effect to the singing of a karaoke singer so that he/she may enjoy singing in sensation by a feeling of acting like a professional singer. Such means are generally called audio effects (hereinafter simply referred to as "effects") . These effects are applied when necessary to the accompaniment music and/or to the singer's voice input from the microphone, in order to bring more reality to the singer's performance.

The Problem which the Invention Attempts to Solve

However, in a conventional karaoke system, when the singer wants to apply the desired effects to his/her voice input from the microphone, he/she had to manually operate the effect device or effector installed in the amplification system from the exterior. That is, the effect controls desired for the voice input could only be accepted manually at the stage where the voice input is finally synthesized with the corresponding accompaniment music regenerated. As has been disclosed in laid-open Japanese patent publication No. Sho 60-23896, there does exist a karaoke system wherein automatic control is provided so that an echo effect of appropriate strength and duration is applied to the voice input from the microphone, while the accompaniment music tape is being played. However, such a device was inflexible, being limited only to echoes in the type of effect.

In general, when an effect is applied to the accompaniment part of a set of music, the settings for types of required effects are incorporated as part of the music information of the accompaniment part and can often be easily controlled in detail automatically. In contrast, in case of settings the same to the voice input from the microphone, a complicated adjustment was necessary, making it difficult to apply desired effects befitting the accompaniment part. Furthermore, even if such adjustments were attempted, a heavy operational burden is placed on the singer him/herself, and this discouraged the singer to purely enjoy the singing itself.

This invention is to solve the above-mentioned problems of the prior art and its first object is to provide an effect control method to automatically apply the desired type of effects to audio information in general without requiring troublesome manual operations.

A second object of the present invention is to provide an effect control device, equipping with concrete means for realizing the above-mentioned first object and to provide a karaoke system using such an effect control device.

A third object of the present invention is to provide an effect control device and by which effects can be initially set for each of a plurality of audio information flexibly when synthesizing said plurality of audio information, and to provide a karaoke system using such an effect control device.

A fourth object of the present invention is to provide an effect control device equipped with concrete means for realizing the above-mentioned third object without enlarging the device size and a karaoke system using such an effect control device.

A fifth object of the present invention is to provide an effect control device which can flexibly accept abrupt temporary effect settings for the audio information obtained from the input devices.

A sixth object of the present invention is to provide an effect control device equipped with the concrete means for realizing the above-mentioned fifth object in an quick, easy and efficient manner, without enlarging the device size.

A seventh object of the present invention is to provide a practical karaoke system using an effect control device achieving the above-mentioned second to sixth objects.

An eighth object of the present invention is to provide an effect control device equipped with concrete means for realizing the above-mentioned seventh object without enlarging the device size.

THE SUMMARY OF THE INVENTION

Technical Improvements & Advantages

Means for Solving the Problem

The present invention is directed to a device and method for storing, selecting, and imparting audio effects to voice and music inputs and outputting the resulting audio signals. In the present invention, a storage means is provided for storing music information and effects associated therewith, and a reading means for reading the information stored in the storing means. Music information regenerating means regenerates the music from the information, and in conjunction a control means transmits the effects information to an effector which applies the audio effects to the regenerated music and a voice input from a microphone. The effect control information for the audio effects are stored together with the music information and are read out concurrently according to an initial setting for voice effects. In the present invention, a temporary setting for the voice effects can be changed so that the effects for the voice will be temporarily changed to the new setting while the music effects are maintained at the default setting.

Operation

The operation of the present invention having the above-mentioned means shall now be described. First, the invention according to claim 1 generally applies different effect controls simultaneously and automatically to a plurality of different audio information (or audio data sets). That is, when a plurality of different audio information need to be synthesized, the contents of the settings for the appropriate effect controls are converted into digital data (hereinafter referred to as "effect control data") and set respectively for each of such audio information. These effect control data are then stored in association with a specific audio information. When the specific audio information is called out, the effect operation data for the plurality of different audio information associated with said specific audio information is also read out automatically. Based on these effect control data, the formerly set contents of the effects are applied to the above-mentioned plurality of different audio information.

By the invention according to claim 2, a concrete composition is provided to bring about the operations indicated in claim 1. That is, an effect control device handles a first audio information stored in a predetermined first storage area in storage means, and one or more sets of additional audio information input to be synthesized with said first audio information. And in such an effect control device, an effect setting means first sets the contents of the effects to be applied to each of said one or more sets of additional audio information input from one or more input means.

The contents of the above-mentioned specified effects are respectively stored as additional effect control data in one or more additional storage areas, each related with said first storage area. Thus when the reading means reads out said first audio information from said first storage area of the storage means, it can also read out the additional effect control data from said one or more second storage areas at the same time.

Said first audio information, read out by the reading means, is transmitted to an audio information regeneration means and regenerated thereat. On the other hand, the additional effect control data, that have been read out at the same time, are directly transmitted to an effect operation means by transmitting means. Based on this transmitted additional effect control data, the effect operation means then applies the specified effects on said one or more additional audio data.

The invention of claim 2 thus provides a concrete composition which enables automatic effect control of a plurality of different audio information.

According to the invention of claim 3, a concrete composition is provided for carrying out automatic effect control on said first audio information as well. That is, a first control data for specifying the contents of the effect to be applied to said first audio information are stored in a third storage, associated with said first audio information. By doing this, various effects can be applied more flexibly to both said first audio information as well as said one or more sets of additional audio information.

According to the inventions of claims 4–6, a composition is provided for carrying out automatic effect control of both said first audio information, said one or more sets of additional audio information in an undivided manner. That is, in the above-mentioned storage means, the first storage area retaining said first audio information, a third storage area retaining said first effect control data set for said audio information, and a additional effect control data set for said one or more sets of additional audio information, may be stored together in the same data block. The scale of the device is thus prevented from becoming enlarged, since different storage areas or storage means do not have to be added for each information or data to be stored.

According to the invention of claims 7, a composition is provided for additionally accepting the conventional manual effect control function externally specified. That is, temporary setting means sets accepts manual specification of certain types of desired effects as temporary effect control data, in addition to the initially set effect control data set by temporary setting means. When both initial and temporary settings are being specified for one single audio input, the temporary effect control data are put with the higher priority to be applied to it.

According to the invention of claim 8, the initial settings are secured even when the temporary effect are performed. That is, the temporary setting is automatically cleared after once applied to audio information. This thus encourages more efficient and smooth effect operation.

According to the inventions of claim 9–11, both the temporary and effect the initial effect settings are performed by using one single setting switch. The effect settings are thus made in a simple and easy way, without enlarging the device size.

According to the inventions of claims 12–21, the operations of the above-described inventions of claims 2–11 can be applied in a practical karaoke system.

Other and further objects, features, and advantages of the present invention will be more fully described in the following description.

BRIEF EXPLANATION OF THE DRAWINGS

FIG. 3 is a schematic drawing which explains the composition of the sound information (MIDI data) into which the effect control data are incorporated in an embodiment of the present invention.

BEST MODE OF CARRYING OUT THE INVENTION

1. Overall Composition

Figure 2:
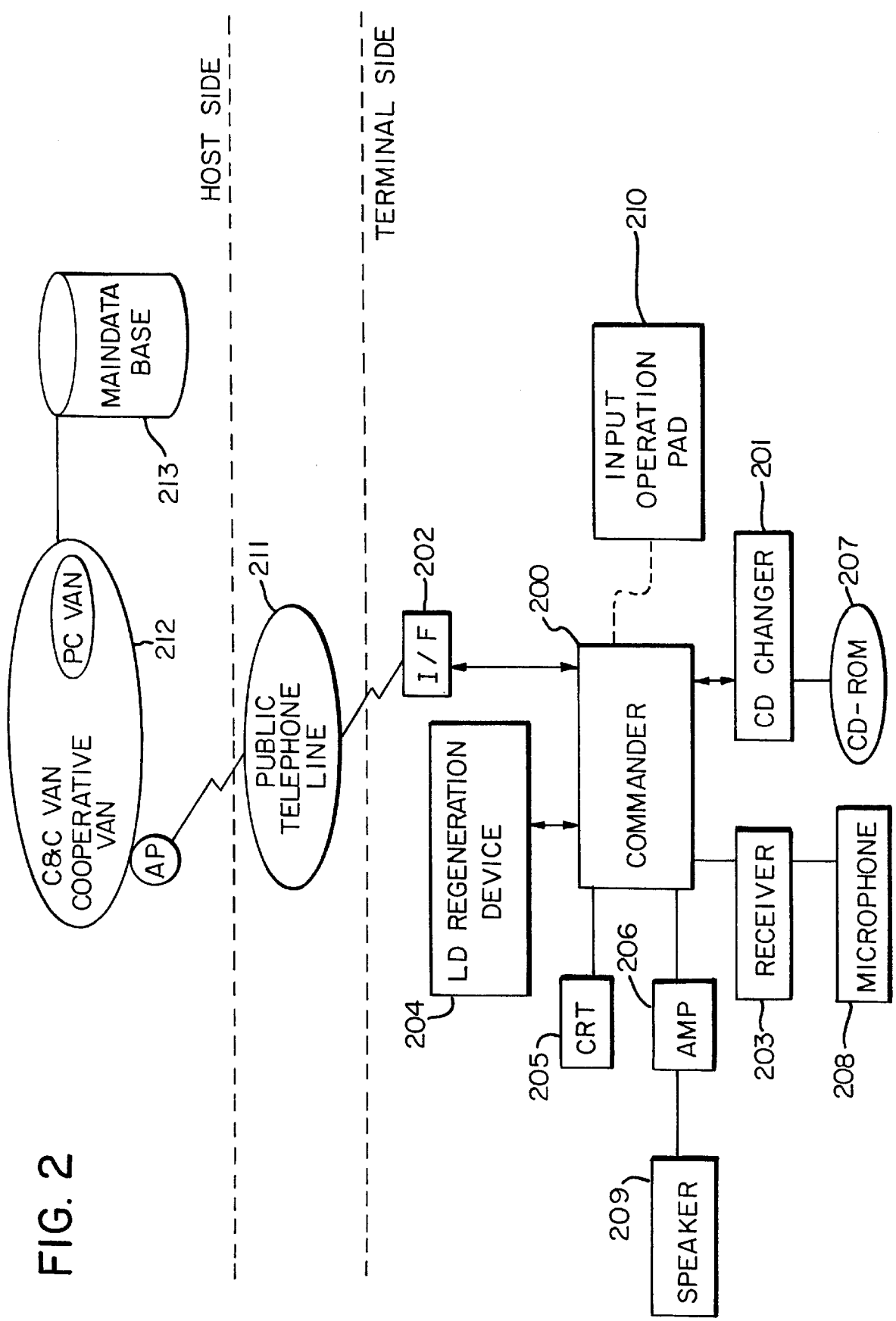
FIG. 2 is a block diagram showing the composition of the commander 200 in an embodiment of the present invention.

An embodiment of the present invention shall now be described with reference to the drawings. FIG. 2 shows the overall composition of a communication karaoke system, which is an embodiment of the present invention. As shown in FIG. 2, the karaoke system of the present embodiment accesses a VAN (Value Added Network) 212 via a public telephone line 211 to obtain the necessary music information from among a vast amount of different music information stored in the main database 213 of a large-scale host computer.

In FIG. 2, the commander 200, which is the terminal karaoke regeneration device, is connected to; a CD changer 201 equipped with an auto-change function for driving a CD-ROM 207, an interface I/F 202 for connecting to the above-mentioned public telephone line 211, an FM receiver 203 for receiving voices input from microphone 208, an LD regeneration device 204 for outputting the desired image during karaoke performance, a CRT (cathode ray tube) 205 for outputting the lyrics (telop) and the accompanying image, and an amplifier 206 for amplifying the music information and the singer's voice and transmitting them to speaker 209. This commander 200 is remote-controlled by means of input operation pad 210 for specifying the music information which is desired to be referred or sung.

In this embodiment, the karaoke music information is compressed and stored in the above-mentioned CD-ROM 207 by the Missing Picture Experts Group standard (MPEG) method. As shown by 3A of FIG. 3, this music information can be sound information or visual information corresponding to the sound information. Among these, the sound information is on audio piece of the music information which mainly concerns the karaoke accompaniment music. The sound information is converted into digital signals in accordance with MIDI standards (hereinafter referred to as MIDI data).

In FIG. 3, each data block 3B for the above-mentioned MIDI data includes sound note data 3a as predetermined sector information, for specifying each note of the sound comprising the accompaniment part of the corresponding music. If necessary, accompaniment effect control data BGECD 3b, which specifies the type of effect to be applied to said sound note data 3a may also be included as a different predetermined sector information in data block 3B. Furthermore, in this embodiment, microphone effect control data, MECD 3c, which specifies the type of effect to be applied to the voice input from microphone 208 in correspondence with said sound note data 3a, may also be included as another predetermined sector information.

Of the music information, the visual information includes character data (hereinafter referred to as telop data), which concern the lyric part of the music information, and image data, which is displayed in accompaniment with the telop data.

Figure 1:
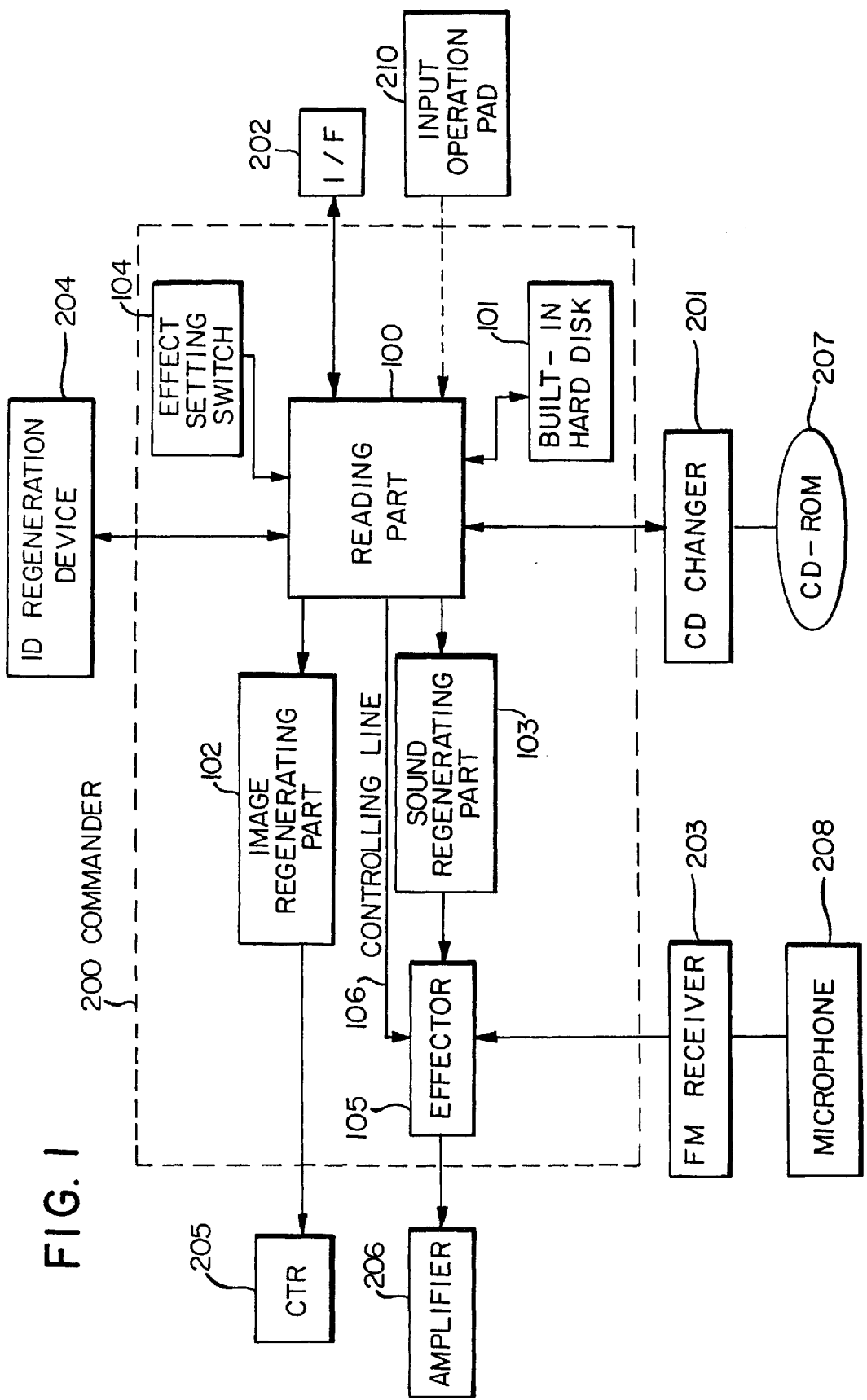
FIG. 1 is a block diagram showing the overall composition of the communication karaoke system of an embodiment of the present invention.

FIG. 1 shows the composition of commander 200, which is the regeneration device of the present embodiment. As shown in FIG. 1, commander 200 comprises a reading part 100 for reading out the karaoke accompaniment music information and the effect control data which controls effect operation done at the effector 105, a built-in hard disk 101, for storing the music information of newly issued songs transmitted from the host database 213, an image regenerating part 102 for synthesizing and regenerating the visual information of said read-out music information, a sound regenerating part 103, for synthesizing and regenerating the sound from said read-out music information, an effect setting switch 104 for setting the contents of the effects to be applied to the voice input from microphone 208, an effector 105 for applying a pre-determined effects to the above-mentioned sound information and/or the above-mentioned voice input from microphone 208, and controlling line 106 for transmitting the effect control data read by the reading part 101 directly to the effector 105.

2. The Operations and Effects of the Present Embodiment

The operations of the communication karaoke system of the present embodiment having the above composition shall now be described.

Operations of the Present Embodiment

The present embodiment is characterized in that the effect control for the voice input via microphone 208 is performed automatically. In order to perform this automatic control, the type of effect to be applied to an arbitrary composition must be set initially with the above-mentioned effect setting switch 104, shown in FIG. 1.

In the present embodiment, effect setting switch 104 is a single switch for specifying and setting the various types of effects to be applied to the voice input via the microphone by selecting a unique number in a rotary fashion. The present embodiment is arranged so that the six effect types (echo, short reverb, harmonizer, exciter, comp, and duck voice) can be set respectively with an integer from 1 to 6 at this effect setting switch 104. For example, if an echo is to be applied to the voice input from microphone 208, the number of the above-mentioned effect setting switch 104 is set initially to "1".

The type of the effect set thus becomes the default value of the above-mentioned microphone effect control data (MECD), and is incorporated as sector information of a pre-determined data block in the sound information(MIDI data) of the corresponding music information, and stored in CD-ROM 207, or, if the above-mentioned music information is on a new tune, stored in built-in hard disk 101.

The operations of the karaoke system of the present embodiment during karaoke performance shall be described next. First, as shown in FIG. 1, the song desired by the singer is specified by means of input operation pad 210. The reading part 100 searches CD-ROM 207 and reads out the music information of the above-mentioned specified song. If the music information of the above-mentioned specified song does not exist within CD-ROM 207, reading part 100 searches the above-mentioned built-in hard disk 101 and reads out the music information of the above-mentioned specified song.

Of the music information read out by reading part 100, the visual information is transmitted to image regenerating part 102. The sound information (MIDI data) is transmitted to sound regenerating part 103. If the microphone effect control data (MECD) is included within the MIDI data at this time, reading part 100 transmits this microphone effect control data directly to effector 105 via controlling line 106.

The visual information, transmitted to the image regenerating part 102, is expanded and regenerated as the telop data and the accompanying image data. Here, if an image other than the image originally accompanying the telop is desired, the video data for the desired image is read out from a separately installed optical disk by LD regeneration device 204 and displayed. This video image data is transmitted via reading part 100 to image regenerating part 102 and is synthesized thereat with the above-mentioned telop data. The visual information synthesized thus is transmitted to CRT 205 and displayed on the monitor.

On the other hand, the MIDI data, which is the transmitted music information, is expanded at the above-mentioned sound regenerating part 103. Of the above-mentioned MIDI data, the sound information for the karaoke accompaniment music is regenerated by a synthesizer based on MIDI standards and transmitted to effector 105. If accompaniment effect control data (BGECD) exists in said MIDI data at this time, it is also transmitted together to effector 105.

The voice of the singer singing the song is directly inputted from microphone 208 and via FM receiver 203 to effector 105.

Of the two types of effect control data transmitted to effector 105, the accompaniment effect control data (BGECD) is originally set as part of the MIDI data and this setting cannot be changed in this case. On the other hand, the microphone effect control data (MECD) is incorporated secondarily into the above-mentioned MIDI data as described above and can thus be set and changeable at any time by means of effect setting switch 104.

Based on the microphone effect control data (MECD) transmitted from reading part 100 and the accompaniment effect control data (BGECD) transmitted from sound regenerating part 102, effector 105 applies the specified effect to the voice input from the microphone and the music information of the above-mentioned regenerated accompaniment music, respectively.

If, during the rendering of the karaoke music, the effect setting switch 104 is manually operated by the singer and a value besides the initially set default value is specified as a desired effect type, the reading part 100 temporarily places priority on said specified value and handles this as microphone effect control data (MECD) and transmits these to effector 105 for effect operation on the microphone-input voice. After the karaoke performance is finished, the above-mentioned specified value is cleared.

The above-mentioned karaoke accompaniment music and the microphone-input voice, to which appropriate effects have been applied by effector 105 as described above, are then mixed and transmitted to amplifier 206 to be amplified and then output via speaker 209 in a manner synchronized with the image displayed on the above-mentioned CRT 205.

Effects of the Present Embodiment

As has been described above, by the present invention, the default value of the type of effect to be applied to the microphone-input voice is set in advance by means of effect setting switch 104 and this default value is securely stored in a specific sector set in the MIDI data. This default value is thereby associated with the sound information for specifying audio data of accompaniment music, and is read out simultaneously with said sound information of the accompaniment music and transmitted to effector 105. The effect control to the corresponding part of microphone-input voice is thus automated.

The microphone effect control data (MECD) is maintained in CD-ROM 207 until the above-mentioned default value is reset. Thus, if an appropriate effect content is set once as a default value, this setting may be used repeatedly. By automating effect control in this manner, the singer him/herself is relieved of the trouble of manually operating the effector each time he/she sings and can always obtain microphone voice with the desired effect applied.

In the present embodiment, if the singer wishes, an effect setting besides the above-mentioned default value can also be accepted from the outside. As a result, a karaoke system can provide the singer with a high level of satisfaction and joy of singing itself, eliminating a complicity of manual effect operation, without enlarging its device size.

Also, since audio information are specified note-by-note in form of MIDI data, the effect control can be set in detail for each note of the sound information. Furthermore, the default value of the effect type setting for the microphone-input voice can be set and changed easily by means of effect setting switch 104. As a result, a karaoke system enables a rich variation of microphone-output voices, to which various effects a high level of satisfaction are applied in a detailed and flexible manner.

3. Other Embodiments

The effect of the present invention is not limited to the present embodiment and can be obtained in various other applications involving audio data input function. For example, the present invention may be applied to an independent music editing device (mixer) or a audio recording device (recorder), or any other device or system which requires effect operation for various kind of audio information. Also, with regards to the present embodiment, the karaoke system does not have to use a communication network via public telephone line, but may be of any other type, as far as it employs the effect control method explained above. Or, a more varied form of chorus function can be enjoyed by preparing a plurality of microphones for input voices and by setting different effect types for each voice input via each microphone. On the other hand, by setting the microphone effect control data (MECD) as identical with the corresponding accompaniment effect control data (BGECD), singing that matches the tone of the accompaniment music can be performed automatically.

Lastly, each sound note data for the sound information comprising the karaoke accompaniment music are stored in a single data block together with the corresponding accompaniment effect control data (BGECD) and microphone effect control data (MECD) in this embodiment, so that they could be read out in an associated manner. However, if an appropriate relation-setup is provided between these data, it is obviously possible to separately store the effect control data in other data blocks of the same storage means or in a completely different storage means.

Industrial Applicability

As described above, the present invention provides an effect control method, an effect control device and a karaoke system using such method or device by which a richly diverse voice output can be obtained with high flexibility and yet without enlarging the device size. The present invention is thus highly practical and beneficial.

What is claimed is:

1. A karaoke machine comprising:

audio information comprising first audio regeneration information, and a plurality of audio effect control information;

storage means for storing said audio information such that each of said plurality of audio effect control information is stored in a separate sector of said storage means;

user control means for inputting an initial audio effect selection from a plurality of audio effect selections whereby each audio effect selection corresponds to a sector of said storage means storing audio effect control information, said initial audio effect selection indicating an audio effect to be applied to an audio input, said audio input comprising first and second audio signals representative of a first audio component generated from said first audio regeneration information and a second audio component, respectively, said user control means further inputting an optional temporary audio effect selection after said initial audio effect has been indicated;

effect control means connected to said user control means and said storage means for retrieving said first audio regeneration information in response to a user request, and additionally retrieving audio effect control information from their separate sectors corresponding to said initial audio effect selection and said optional temporary audio effect selection inputted by said user control means, wherein said effect control means automatically clears the input of said temporary audio effect selection at a conclusion of said first audio regeneration information such that subsequent operations of said effect control means will proceed as if no temporary audio effect selection has been inputted unless a new temporary audio input selection has been inputted after said clearing;

first audio regeneration means for receiving said retrieved first audio regeneration information from said effect control means and generating said first audio signal representative of said first audio component;

second audio input means for receiving said second audio component and generating said second audio signal representative of said second audio component;

audio effect application means connected to said first audio regeneration means and said second audio means for receiving said initial audio effect selection from said user control means and applying said audio effect control data retrieved from said effect control means to said first and second signals unless an optional temporary audio effect selection has been inputted, and thereupon applying said audio effect control data corresponding to said initial audio effect selection to said first signal and applying said audio effect control data corresponding to said temporary audio effect to said second signal; and audio output means for receiving a first audio signal with effects and a second audio signal with effects corresponding to said first audio component with corresponding initial audio effects and said second audio component with initial audio effects, respectively, unless a temporary audio effect selection has been inputted, and thereupon said second audio signal comprises said second audio component with temporary audio effects, and combining the two inputs to generate an audio output.

2. The karaoke machine as recited in claim 1 wherein said audio regeneration data comprises Musical Instrument Digital Interface (MIDI) data.

3. The karaoke machine as recited in claim 1 wherein said audio effect control information corresponds to an echo effect.

4. The karaoke machine as recited in claim 1 wherein said audio effect control information corresponds to a reverb effect.

5. The karaoke machine as recited in claim 1 wherein said audio effect control information corresponds to a harmonizer effect.

6. The karaoke machine as recited in claim 1 wherein said audio effect control information corresponds to an exciter effect.

7. The karaoke machine as recited in claim 1 wherein said audio effect control information corresponds to a duck voice effect.

8. The karaoke machine as recited in claim 1 wherein said user control means comprises a manually operated rotating dial.

9. The karaoke machine as recited in claim 1 wherein said second audio component comprises a user's voice.

10. The karaoke machine as recited in claim 1 wherein said storage means comprises a CD ROM.

11. The karaoke machine as recited in claim 1 wherein said second audio input means comprises a microphone.

12. The karaoke machine as recited in claim 1 further comprising means for receiving video data stored with said audio information, and means for converting said video data into a video signal to be displayed by a connected video display unit.

13. The karaoke machine as recited in claim 12 wherein said video data includes character data corresponding to lyrics of said audio information.

14. The karaoke machine as recited in claim 12 further comprising means for receiving alternate video data whereby said alternate video data is stored separate from said audio information.

* * * * *